United States Patent
Yoshimi et al.

(10) Patent No.: US 12,542,008 B2
(45) Date of Patent: Feb. 3, 2026

(54) CENTER DEVICE AND IN-VEHICLE ELECTRONIC CONTROL DEVICE

(71) Applicant: DENSO CORPORATION, Kariya (JP)

(72) Inventors: Hideo Yoshimi, Kariya (JP); Masaaki Abe, Kariya (JP)

(73) Assignee: DENSO CORPORATION, Kariya (JP)

( * ) Notice: Subject to any disclaimer, the term of this patent is extended or adjusted under 35 U.S.C. 154(b) by 920 days.

(21) Appl. No.: 17/666,618

(22) Filed: Feb. 8, 2022

(65) Prior Publication Data

US 2022/0284743 A1 Sep. 8, 2022

(30) Foreign Application Priority Data

Mar. 2, 2021 (JP) ................................. 2021-032593

(51) Int. Cl.
*G07C 5/00* (2006.01)
*G06F 16/23* (2019.01)
*G07C 5/08* (2006.01)

(52) U.S. Cl.
CPC ......... *G07C 5/008* (2013.01); *G06F 16/2358* (2019.01); *G07C 5/085* (2013.01)

(58) Field of Classification Search
CPC ...... G06F 16/2358; G06F 8/65; G06F 21/572; G06F 8/654; G06F 21/53; G06F 21/57; G06F 2221/033; G06F 9/445; G06F 9/54; G06F 11/1433; G06F 21/44; G06F 21/51; G06F 21/604; G06F 21/6281; G06F 21/629; G06F 2221/2149; G06F 8/33; G06F 8/34; G06F 8/35; G06F 8/38; G06F 8/658; G06F 8/71; G06F 9/541; G06F 11/0721; G06F 11/0751; G06F 11/0757; G06F 11/0772; G06F 11/079; G06F 11/0793;
(Continued)

(56) References Cited

U.S. PATENT DOCUMENTS 10,776,169 B2 * 9/2020 Teshler ................. G06F 9/5027
10,789,121 B2 * 9/2020 Fox ........................... G06F 8/60
(Continued)

FOREIGN PATENT DOCUMENTS

JP 2020-27624 A 2/2020

OTHER PUBLICATIONS

Aust, Stefan. "Vehicle update management in software defined vehicles." 2022 IEEE 47th Conference on Local Computer Networks (LCN). IEEE, 2022. (Year: 2022).*

*Primary Examiner* — Matthew J Brophy
(74) *Attorney, Agent, or Firm* — Harness, Dickey & Pierce, P.L.C.

(57) ABSTRACT

A center device includes an individual vehicle information DB which stores device identity information and information regarding a software architecture of the relevant device together with a vehicle category for each of a plurality of ECUs. In a PKG structure DB, for each of the plurality of ECUs, information regarding a structure of a package to be distributed for data update is stored according to a type of each of the ECUs. Based on the information stored in the individual vehicle information DB and the PKG structure DB, a determination unit identifies a package to be distributed for a target vehicle having a target device whose data is updated among the plurality of ECUs, and a PKG generation unit generates a package including the information indicating the structure of the identified package.

11 Claims, 14 Drawing Sheets

(58) Field of Classification Search
CPC ............ G06F 11/1625; G06F 11/1629; G06F 11/1641; G06F 11/3612; G06F 12/0284; G06F 12/0646; G06F 16/188; G06F 16/2365; G06F 16/2379; G06F 21/1013; G06F 21/445; G06F 21/50; G06F 21/575; G06F 21/577; G06F 21/6218; G06F 2201/865; G06F 2212/1008; G06F 2212/1044; G06F 2212/1056; G06F 2221/2107; G06F 2221/2113; G06F 2221/2137; G06F 2221/2141; G06F 2221/2151; G06F 3/0604; G06F 3/0659; G06F 3/0673; G06F 7/588; G06F 8/60; G06F 8/656; G06F 8/66; G06F 9/4401; G06F 9/44521; G06F 9/4881; G06F 9/4887; G06F 9/5027; G06F 9/505; G06F 9/5066; G06F 9/542; G06F 9/545; G07C 5/008; G07C 5/085; H04L 2209/84; H04L 67/12; H04L 67/34
USPC .......................................................... 717/168
See application file for complete search history.

(56) References Cited

U.S. PATENT DOCUMENTS

| | | | | |
|---|---|---|---|---|
| 11,347,892 B2* | 5/2022 | Shadrin | ................ | H04W 12/08 |
| 11,361,090 B2* | 6/2022 | Shadrin | ................ | G06F 21/604 |
| 11,392,353 B2* | 7/2022 | Moors | ................ | G06F 8/35 |
| 11,537,382 B2* | 12/2022 | Yamamoto | ............ | B60W 50/00 |
| 2014/0006555 A1* | 1/2014 | Shields | ................ | H04L 67/06 709/217 |
| 2014/0282470 A1* | 9/2014 | Buga | ................ | G06F 8/65 717/170 |
| 2017/0134164 A1* | 5/2017 | Haga | ................ | G06F 21/445 |
| 2018/0107507 A1* | 4/2018 | Lin | ................ | G06F 9/5066 |
| 2019/0007215 A1* | 1/2019 | Hakuta | ................ | H04W 12/069 |
| 2020/0050378 A1 | 2/2020 | Sakurai et al. | | |
| 2020/0050442 A1* | 2/2020 | Sakurai | ................ | H04W 4/48 |
| 2020/0133267 A1* | 4/2020 | Bhat | ................ | H04L 67/1095 |
| 2020/0183676 A1 | 6/2020 | Sakurai et al. | | |
| 2020/0241771 A1 | 7/2020 | Sakurai et al. | | |
| 2020/0264864 A1* | 8/2020 | Yang | ................ | H04L 9/3247 |
| 2021/0089280 A1* | 3/2021 | Moors | ................ | G06F 8/35 |
| 2021/0155176 A1 | 5/2021 | Harata et al. | | |
| 2021/0157529 A1 | 5/2021 | Sakurai et al. | | |
| 2021/0157566 A1 | 5/2021 | Sakurai et al. | | |
| 2021/0157567 A1 | 5/2021 | Sakurai et al. | | |
| 2021/0157568 A1 | 5/2021 | Sakurai et al. | | |
| 2021/0157571 A1 | 5/2021 | Ogawa et al. | | |
| 2021/0157572 A1 | 5/2021 | Harata et al. | | |
| 2021/0157575 A1 | 5/2021 | Ogawa et al. | | |
| 2021/0157902 A1 | 5/2021 | Sakurai et al. | | |
| 2021/0157941 A1* | 5/2021 | Shadrin | ................ | B60R 16/0231 |
| 2021/0397724 A1* | 12/2021 | Shadrin | ................ | G06F 21/604 |
| 2021/0398364 A1* | 12/2021 | Tschache | ................ | G06F 8/71 |
| 2023/0025735 A1* | 1/2023 | Acharya | ................ | H04L 67/12 |
| 2023/0114009 A1* | 4/2023 | Morita | ................ | G06F 8/65 726/22 |
| 2024/0272977 A1* | 8/2024 | Abdelhameed | ..... | G06F 11/0757 |

* cited by examiner

FIG. 4

| PKG STR NO. | CENTRAL ECU PF | WRT TGT ECU PF | OTA METHOD | INTEG PKG CONFIG | FILES NOT IN INTEG PKG |
|---|---|---|---|---|---|
| 1 | AP (Adaptive PF) | AP | STORAGE | Vehicle PKG<br>SW PKG A,<br>SW PKG B | N.A. |
| 2 | AP | AP | STREAMING | Vehicle PKG | SW PKG A,<br>SW PKG B |
| 3 | AP | CP | STORAGE | Vehicle PKG<br>SPEC DATA<br>FILE CONFIG INFO<br>DIFF DATA<br>(+ VERI DATA) | N.A. |
| 4 | AP | CP | STREAMING | Vehicle PKG | DIFF DATA 1<br>DIFF DATA 2 |
| 5 | CP (Classic PF) | AP | STORAGE | SW PKG A,<br>SW PKG B<br>SPEC DATA<br>FILE CONFIG INFO<br>(+ VERI DATA) | N.A. |
| 6 | CP | AP | STREAMING | SPEC DATA<br>FILE CONFIG INFO<br>(+ VERI DATA) | SW PKG A,<br>SW PKG B |
| 7 | CP | CP | STORAGE | SPEC DATA<br>FILE CONFIG INFO<br>DIFF DATA 1<br>DIFF DATA 2<br>(+ VERI DATA) | N.A. |
| 8 | CP | CP | STREAMING | SPEC DATA<br>FILE CONFIG INFO<br>(+ VERI DATA) | DIFF DATA 1<br>DIFF DATA 2 |

44

FIG. 8
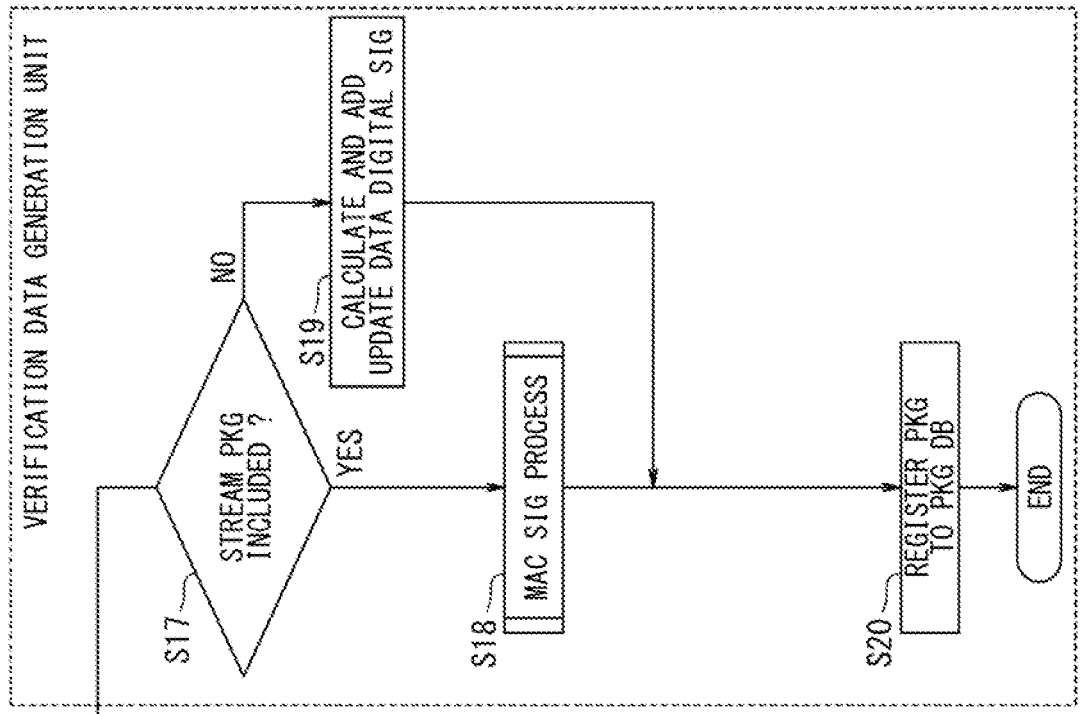
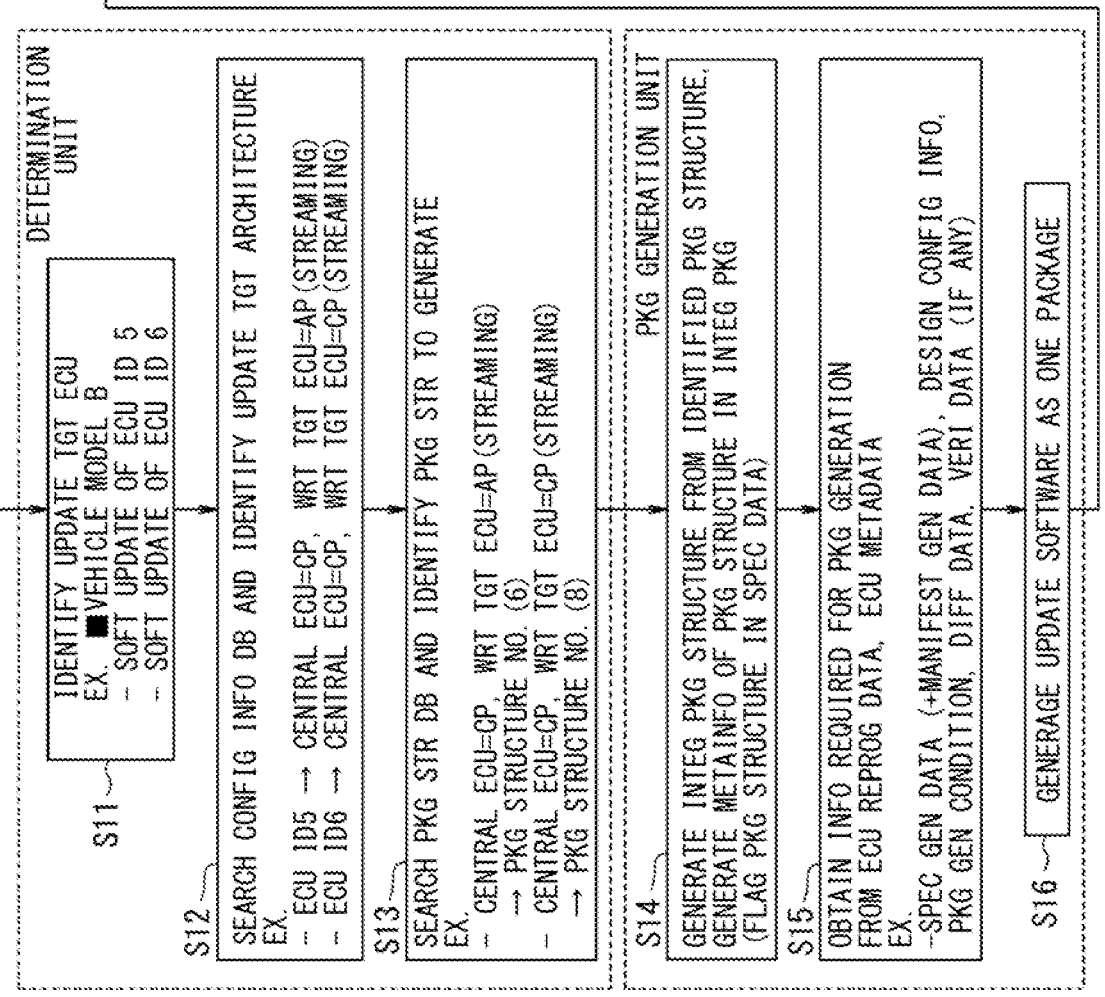

CENTER DEVICE AND IN-VEHICLE ELECTRONIC CONTROL DEVICE

CROSS REFERENCE TO RELATED APPLICATION

The present application is based on and claims the benefit of priority of Japanese Patent Application No. 2021-032593, filed on Mar. 2, 2021, the disclosure of which is incorporated herein by reference.

TECHNICAL FIELD

The present disclosure generally relates to a center device that manages data to be written in a plurality of electronic control devices mounted on a vehicle, and an in-vehicle electronic control device that communicates with the center device.

BACKGROUND INFORMATION

In recent years, with the diversification of vehicle control such as driving assist control and autonomous driving control, the scale of application programs such as vehicle control and diagnosis installed in electronic control units (ECUs) of the vehicle is going up. In addition, the need to rewrite (or overwrite, or "reprog") an application program of the ECU, is increasing due to many version upgrades for to functional improvements and the like.

A comparative example provides a technique of distributing an ECU update program from a server to an in-vehicle device by OTA (Over The Air) and rewriting the update program on the vehicle side.

Further, as shown in FIG. 14, regarding a package structure for distributing the update program according to an ECU platform, the specifications published by a general incorporated association JASPAR (Japan Automotive Software Platform and Architecture) define data requirements applicable to a classic platform (CP) running on a static OS (Operating System) of) of a standardization organization AUTOSAR (AUTomotive Open System ARchitecture). In addition, AUTOSAR defines data requirements applicable to new types of adaptive platform (AP) operable on dynamic operating system.

SUMMARY

It is an object of the present disclosure to provide a center device capable of distributing all update data in one package and to provide an in-vehicle electronic control device for use in a vehicle, which is updatable upon receiving the package of the update data, regardless of whether or not the in-vehicle electronic control devices of update target are mixture of different types.

BRIEF DESCRIPTION OF THE DRAWINGS

Objects, features, and advantages of the present disclosure will become more apparent from the following detailed description made with reference to the accompanying drawings, in which:

FIG. 4 is a diagram showing information registered in a PKG structure DB;

FIG. 8 is a flowchart showing a distribution package generation process in the center device;

DETAILED DESCRIPTION

Figure 1:
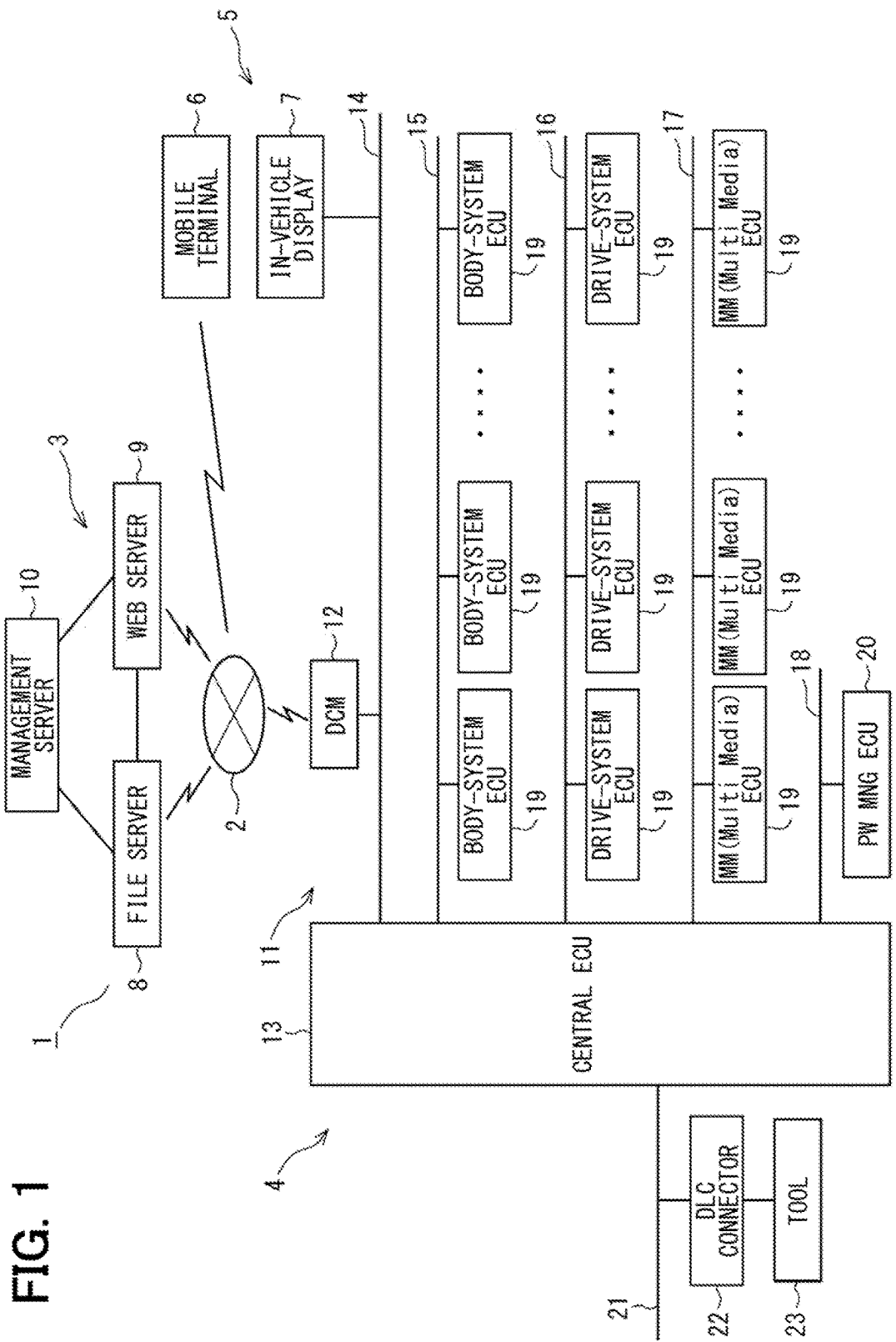
FIG. 1 is a functional block diagram showing a configuration of a vehicle-side system according to an embodiment.

The following describes an embodiment of the present disclosure with reference to the accompanying drawings. A vehicle program rewriting system is a system that can rewrite application programs such as vehicle control and diagnosis of an ECU mounted on a vehicle by OTA. As shown in FIG. 1, a vehicle program rewriting system 1 includes a center device 3 on a communication network 2 side, a vehicle-side system 4 on a vehicle side, and a display terminal 5. A communication network 2 includes, for example, a mobile communication network using a 4G line or the like, the Internet, WiFi (Wireless Fidelity: registered trademark), and the like.

The display terminal 5 is a terminal having a function of accepting operation input from a user and a function of displaying various screens, and includes, for example, a mobile terminal 6 such as a smartphone or tablet that can be carried by the user, and an in-vehicle display 7 such as a display or a meter display that also provides a navigation function arranged in a vehicle interior to serve as a display device. The mobile terminal 6 can be connected to the communication network 2 as long as it is within a communication range of the mobile communication network. The in-vehicle display 7 is connected to the vehicle-side system 4.

If the user is outside the vehicle interior and within the communication range of the mobile communication network, the user can input operations while checking various screens involved in the rewriting of the application program on the mobile terminal 6, and can perform a procedure related to the rewriting of the application program. In the vehicle interior, the user can perform an operation input while checking various screens involved in the rewriting of the application program on the in-vehicle display 7, and can perform a procedure related to the rewriting of the application program. That is, the user can property use the mobile terminal 6 and the in-vehicle display 7 outside the vehicle interior and inside the vehicle interior to perform procedures involved in rewriting the application program.

The center device 3 controls the functions of the OTA on the communication network 2 side in the vehicle program rewriting system 1 and functions as an OTA center. The center device 3 has a file server 8, a web server 9, and a management server 10, and the servers 8 to 10 are configured to enable data communication with each other.

The file server 8 is a server, which has a management function of an application program transmitted from the center device 3 to the vehicle-side system 4, for managing (i) ECU programs and relevant information provided by a supplier or the like which is a provider of application programs, (ii) distribution specification data provided by OEM (Original Equipment Manufacturer), and (iii) vehicle state obtained from the vehicle-side system 4, and the like. The file server 8 can perform data communication with the vehicle-side system 4 via the communication network 2, and, when a download request for a distribution package is generated, transmits, to the vehicle-side system 4, a distribution package that packages a reprog data (for rewriting or overwriting) and distribution specification data. Alternatively, when a download request for the distribution package is generated, a distribution package in which the distribution specification data is packaged and the reprog data are transmitted to the vehicle-side system 4. The web server 9 is a server that manages web information, and provides the mobile terminal 6 with various screens involved in rewriting the application program. The management server 10 manages personal information and the like of the user registered in an application program rewriting service, and manages an application program rewriting history and the like for each vehicle.

The vehicle-side system 4 has a master device 11. The master device 11 includes a DCM (Data Communication Module) 12 and a central ECU 13, and the DCM 12 and the central ECU 13 are connected to each other via a first bus 14 for data communication. The DCM 12 is an in-vehicle communication device that performs data communication with the center device 3 via the communication network 2. When the distribution package is downloaded from the file server 8, write data is extracted from the distribution package and transferred to the central ECU 13. Alternatively, when the DCM 12 downloads the distribution package from the file server 8, the DCM 12 transfers the distribution package to the central ECU 13. The central ECU 13 extracts the write data from the distribution package.

The central ECU 13 is a vehicle gateway device having a data relay function, and when the write data is obtained from the DCM 12, the write data is distributed to a rewrite target ECU that rewrites the application program. The master device 11 controls an OTA function on the vehicle side in the vehicle program rewriting system 1, and functions as an OTA master. Although FIG. 1 illustrates a configuration in which the DCM 12 and the in-vehicle display 7 are connected to the first bus 14, the DCM 12 and the in-vehicle display 7 may be connected to different buses. The central ECU 13 corresponds to a relay device of the present disclosure.

In addition to the first bus 14, a second bus 15, a third bus 16, a fourth bus 17, and a fifth bus 18 are connected to the central ECU 13 as buses inside the vehicle, and various types of ECUs 19 are connected via the buses 15 to 17, and a power management ECU 20 is connected via the bus 18.

The second bus 15 is, for example, a body-system network bus. The ECUs 19 connected to the second bus 15 are respectively, for example, an ECU that controls body system, such as a door ECU that controls door lock/unlock, a meter ECU that controls meter display, an air-conditioner ECU that controls drive of an air conditioner, a window ECU that controls window opening/closing and the like. The third bus 16 is, for example, a drive-system network bus. The ECUs 19 connected to the third bus 16 are respectively, for example, an ECU that controls drive system, such as an engine ECU that controls drive of an engine, a brake ECU that controls drive of a brake, an ECT (Electronic Controlled Transmission) ECU that controls drive of an automatic transmission, and a power steering ECU that controls drive of a power steering.

The fourth bus 17 is, for example, a so-called MM network bus for accommodating a multimedia, e.g., video and sound. The ECUs 19 connected to the fourth bus 17 are respectively an ECU for handing multimedia, such as a navigation ECU for controlling a navigation system, an ETC ECU for controlling an ETC (Electronic Toll Collection System: registered trademark) system and the like. The buses 15 to 17 may be buses of a system other than the body-system network bus, the drive-system network bus, and the multimedia network bus. Also, the number of the buses and the ECUs 19 are not necessarily limited to the number described above. The power management ECU 20 is an ECU having a function of performing power management of the DCM 12, the central ECU 13, various ECUs 19, and the like.

The sixth bus 21 is connected to the central ECU 13 as a bus outside the vehicle. A DLC (Data Link Coupler) connector 22 to which a tool 23 is detachably connected is connected to the sixth bus 21. The buses 14 to 18 on the inside of the vehicle and the buses 21 on the outside of the vehicle are composed of, for example, CAN (Controller Area Network: registered trademark) buses, and the central ECU 13 performs data communication according to a CAN data communication standard or a diagnostic communication standard (UDS: ISO14229) with the DCM 12, various ECUs 19, and the tool 23. Note that the DCM 12 and the central ECU 13 may be connected by Ethernet, or the DLC connector 22 and the central ECU 13 may be connected by Ethernet.

When a rewrite target ECU 19 receives the write data from the central ECU 13, the rewrite target ECU 19 writes the write data in a flash memory and rewrites an application program. In the above configuration, when the central ECU 13 receives a write data acquisition request from the rewrite target ECU 19, the central ECU 13 functions as a reprog master that distributes the write data to the rewrite target ECU 19. When the rewrite target ECU 19 receives the write data from the central ECU 13, the rewrite target ECU 19 functions as a reprog slave that writes the write data to the flash memory and rewrites the application program. Note that the "rewrite target ECU" may be referred to as a "target ECU."

Modes of rewriting the application program include a mode of rewriting by wire and a mode of rewriting by wireless. In the mode of rewriting the application program by wire, when the tool 23 is connected to the DLC connector 22, the tool 23 transfers the write data to the central ECU 13. The central ECU 13 relays or distributes the write data transferred from the tool 23 to the rewrite target ECU 19. In the mode of wirelessly rewriting the application program, as described above, when the DCM 12 downloads the distribution package from the file server 8, the DCM 12 extracts the write data from the distribution package and transfers the write data to the central ECU 13.

Figure 2:
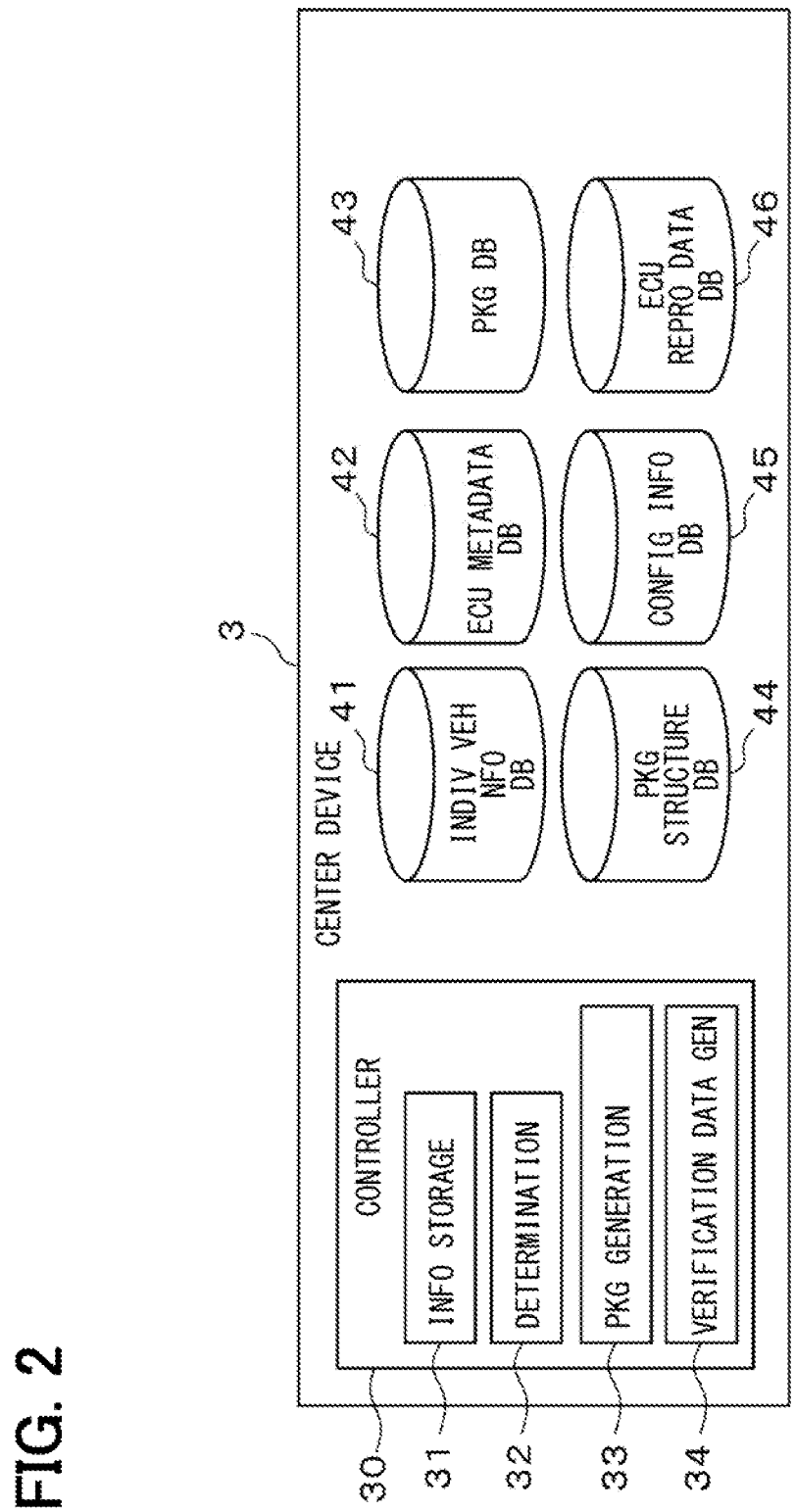
FIG. 2 is a functional block diagram showing a configuration of a center device.

As shown in FIG. 2, the center device 3 which is also a package generation server includes a controller 30 and databases 41 to 46. In the following, "database" may be referred to as "B." In addition, "package" may be referred to as "PKG." In addition, "software package" may be referred to as "SW PKG." The controller 30 has functional blocks such as an information storage unit 31, a determination unit 32, a PKG generation unit 33, and a verification data generation unit 34, which are realized by the functions of hardware and software provided by a microcomputer.

Next, the contents of the data registered in each of databases 41 to 46 are described. The individual vehicle information DB 41 mainly registers configuration information for each of the vehicles and status information of each of the vehicle with respect to program update. Specifically, for an ID of each vehicle "VIN", the configuration information is registered such as "Vehicle SW ID", "System ID", "ECU ID", "ECU SW ID" and the like. A "Digest" value, which is a hash value for the configuration information, is also calculated and stored in the center device 3. An "operation bank" is a bank in which a program currently operated by the ECU 19 is written when a memory has two-bank configuration having two banks, and an uploaded value that is uploaded together with the configuration information is registered. The ID of each vehicle is vehicle identification information, and may be a chassis number instead of VIN.

The following ECU-specific specification data is registered in the ECU metadata DB 42, for example. That is, for the latest "ECU SW ID", the following is registered as the specification data: the size of a update data file, the size of a rollback data file, bank information indicating which of bank A, bank B, bank C and the like the program is for when the flash memory provided in the ECU 19 has two-or-more-bank configuration, transfer size, read address for reading the program file, etc. These are examples of update data related information.

In addition, attribute information indicating the attributes of the ECU 19 is also registered in the ECU metadata DB 42. The attribute information is information indicating hardware attributes and software attributes related to the ECU. The "transfer size" is a transfer size (of a divided portion of the data) when the rewrite data is divided and transferred from the central ECU 13 to the ECU 19, and a "key" is a key used when the central ECU 13 securely accesses the ECU 19. These are examples of the software attribute information. Further, regarding the "vehicle model" and the "ECU ID", memory configuration of a flash memory 28d included in the ECU 19, the category of bus to which the ECU 19 is connected, the type of the power supply connected to the ECU 19, and the like are also included. These are examples of the hardware attribute information. The package DB 43 registers IDs of the distribution package, files of the distribution package, and data for verifying integrity of the distribution package.

Figure 3:
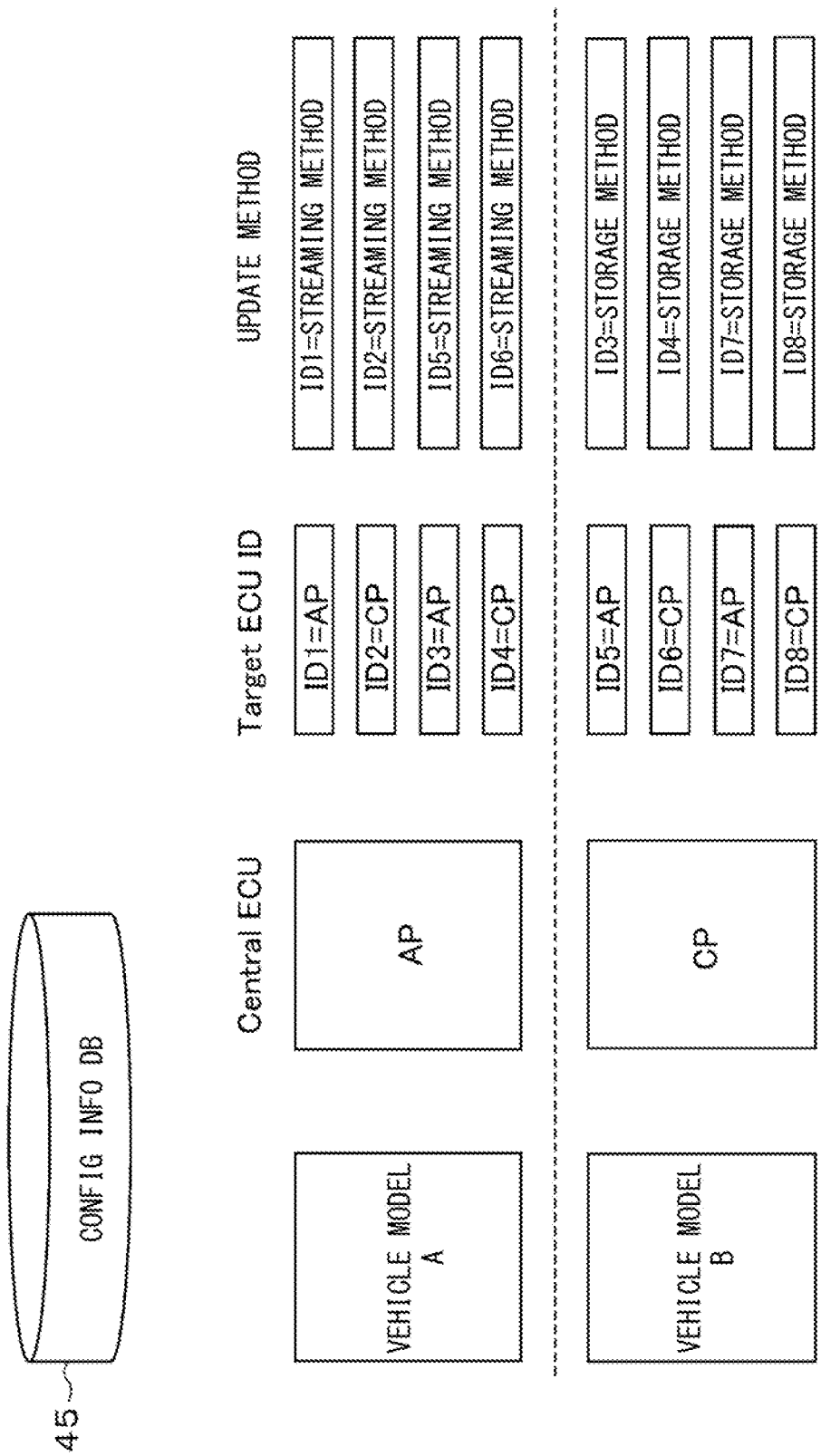
FIG. 3 is a diagram showing information registered in a configuration information DB.

As shown in FIG. 3, the configuration information DB 45 registers, for each vehicle model, a platform of the central ECU 13, an ID of the target ECU 19, an update method for platform and the reprog. The configuration information DB corresponds to a vehicle information storage unit. In the following, a platform may be referred to as "PF". The "vehicle model" is an ID of each vehicle specified according to a vehicle type, release date, grade of the vehicle, destination, and the like. The "vehicle model" corresponds to a category of the vehicle. The distribution package for distributing the update program may be structured as two types, i.e., a package applicable to a CP operable on a static OS defined in the AUTOSAR specifications and a package applicable to an AP operable on a dynamic OS.

Here, the difference between AP and CP is described. AP and CP represent software platforms. Software platform may also be called software architecture. CP stands for AUTOSAR Classic Platform and AP stands for AUTOSAR Adaptive Platform. Further, an ECU that operates in accordance with the CP specifications may be referred to as a CP ECU or an ECU for CP, and an ECU that operates in accordance with the AP specifications may be referred to as an AP ECU or an ECU for AP.

The operating system, the so-called OS, and development language is different for AP and CP. The CP ECU and AP ECU have different receivable package structures (i.e., receive differently-structured package data). The difference in the structure of the packages is mainly due to the difference in the processing performance of the ECU, and since the processing performance of the ECU for CP is generally low, the specification data included in the package for CP ECU is described as binary data, realizing package data structure of easy interpretation/processing by an ECU with low processing performance.

On the other hand, since the AP ECU generally has high processing performance, which allows the AP ECU to have a parser function that analyzes structural character data written in programming language and converts it into a data structure that is handleable by a program, the package data structure is not a simple binary data, but an object-oriented data format such as JSON (JavaScript Object Notation), which realizes flexible package data structure.

Regarding the update of the application program, there are two methods: a storage method in which all the update programs are downloaded from the center device 3 to the memory on the vehicle side and then updated; and a streaming method in which the update program is updated while being downloaded from the center device 3 to the vehicle side.

In an example shown in FIG. 3, the central ECU 13 of a vehicle model A has an AP and the IDs of the target ECU 19 are "1 to 4", and the PFs of the target ECUs are a mixture of AP and CP. Regarding the update method. ID1 and ID2 are streaming methods, and ID3 and ID4 are storage methods. The central ECU 13 of the vehicle model B has a CP, the IDs of the target ECU 19 are "5 to 8", and the PFs of the target ECUs are a mixture of AP and CP. Regarding the update method, ID5 and ID6 are streaming methods, and ID7 and ID8 are storage methods. The above update method may be referred to as an OTA (Over The Air) method.

Initial values are registered in the configuration information DB 45 at the time of production or sale of the vehicle, and the registered information is subsequently updated as the version of the application program of any one or more ECUs is updated. That is, the configuration information DB 45 shows the configuration information that normally exists in the market for each vehicle model.

As shown in FIG. 4, eight types Nos. 1 to 8 are registered as package structures in the PKG structure DB 44. The PKG structure D8 44 defines (i) the configurations of the package distributed from the center device 3 to the vehicle-side system 4 when the application program is rewritten, and (ii) the file distributed without being included in the package. In Nos. 1 to 4, the PF of the central ECU 13 is AP, and in Nos. 5 to 8, the PF of the central ECU 13 is CP. In Nos. 1, 2, 5, and 6, the PF of the target ECU 19 is AR and in Nos. 3, 4, 7, and 8, the PF of the target ECU 19 is CP. Nos. 1, 3, 5, and 7 have an OTA method of "storage," and Nos. 2, 4, 6, and 8 have an OTA method of "streaming."

The configuration of the package and the file distributed without being included in the package are determined based on the PF of the central ECU 13, the PF of the target ECU 19, and the OTA method from the central ECU 13 to the target ECU 19. As described above, the PF of the central ECU 13 includes a case where the central ECU 13 is an AP ECU and a case where the central ECU 13 is a CP ECU. Similarly, the PF of the target ECU 19 includes a case where the target ECU 19 is an AP ECU and a case where the target ECU 19 is a CP ECU.

When the PF of the central ECU 13 is AP, a Vehicle PKG is included so that a UCM (Update Configuration Management software module) master in the central ECU 13 can interpret it. On the other hand, when the PF of the central ECU 13 is CP, the specification data, the file configuration information, and the verification data are included so that the OTA master in the central ECU 13 can interpret them. Further, when the PF of the target ECU 19 is AP, a software package (also referred to as Software PKG or SW PKG) is included so that a UCM (Update Configuration Management software module) in the target ECU 19 can interpret it. The UCM may be referred to as UCM subordinate.

When the PF of the target ECU 19 is CP, the specification data, the file configuration information, and the verification data are included so that the installer can interpret them. Since the UCM master and UCM are explained in AUTOSAR, some details are omitted, but some details are discussed below. Further, since the OTA master and the installer are explained in the JISPAR standard document, some details are discussed below.

Further, when the OTA method is streaming, the update data is not included in the package. On the other hand, when the OTA method is storage, the update data is included in the package. The PKG structure DB 44 represents a data format required for updating the application program of the target ECU 13 for each of the target ECUs 13, that is, a package configuration, a file distributed without being included in the package, and the like.

Here, the package distributed to each vehicle is composed of an integrated package and attachment files not included in the integrated package. In Nos. 1 to 4 in which the central ECU 13 is an AP, the integrated package includes a vehicle package described as "Vehicle PKG" in the drawing. Nos. 1, 2, 5, and 6 in which the target ECU 19 is an AP include a software package described as "SW PKG" in the drawing. However, in Nos. 1 and 5 where the OTA method is storage, the software package is included in the integrated package, but in Nos. 2 and 6, the software package is not included in the integrated package and is a separate file. The integrated package is distributed to the vehicle system 4 as a compressed file, and the attachment files are distributed to the vehicle system 4 uncompressed.

A software package is a unit of installation processing performed by an ECU, and includes, for example, an executable file of one or more applications developed on an AP, an OS or firmware update file, configuration data, calibration data, and the like. Each package contains manifest information that supplies metadata such as package name, version information, dependencies, and vendor-specific information required for package processing. The UCM (Update Configuration Management), which is a software module mounted on the target ECU 19, processes a vendor-specific software package based on the metadata. Note that "SW PKG A. B" shown in the drawing shows two packages as an example, and may also be one package or may also be three or more packages.

Figure 5:
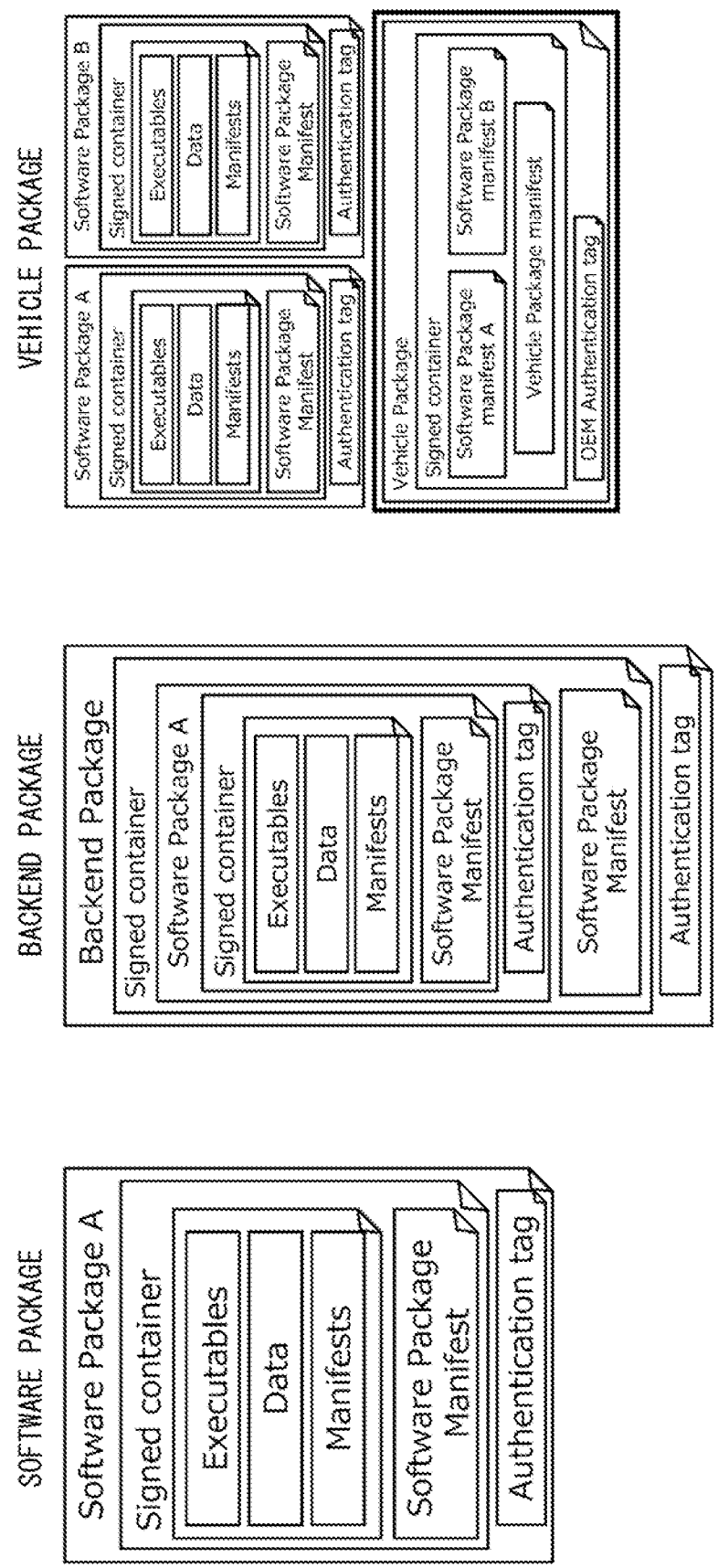
FIG. 5 is a diagram of a software package, a backend package, and a vehicle package.

As shown in FIG. 5, software packages are supplied to OEMs by various suppliers. In an OEM server, a backend package is generated corresponding to each package. The backend package includes a software package, and information such as a diagnostic address and ID of the UCM to which the package is distributed is added to the manifest information. Then, a vehicle package is generated from a plurality of backend packages. Multiple software packages required for each vehicle are integrated, and the vehicle package has a vehicle package manifest added to the manifest of each software package.

The vehicle package manifest includes information necessary to control and distribute campaigns distributed to vehicles as notifications that data update is ready, such as dependencies, target vehicles, safety policies, driver notification settings, and the like. The UCM master, which is a software module mounted on the central ECU 13, controls which software package is transferred to which UCM and in what order, when (i.e., after) the updated contents of data are grasped by Interpreting the vehicle package. Then, the UCM interprets the software package passed from the UCM master, and executes the installation process of the target ECU 19.

Figure 14:
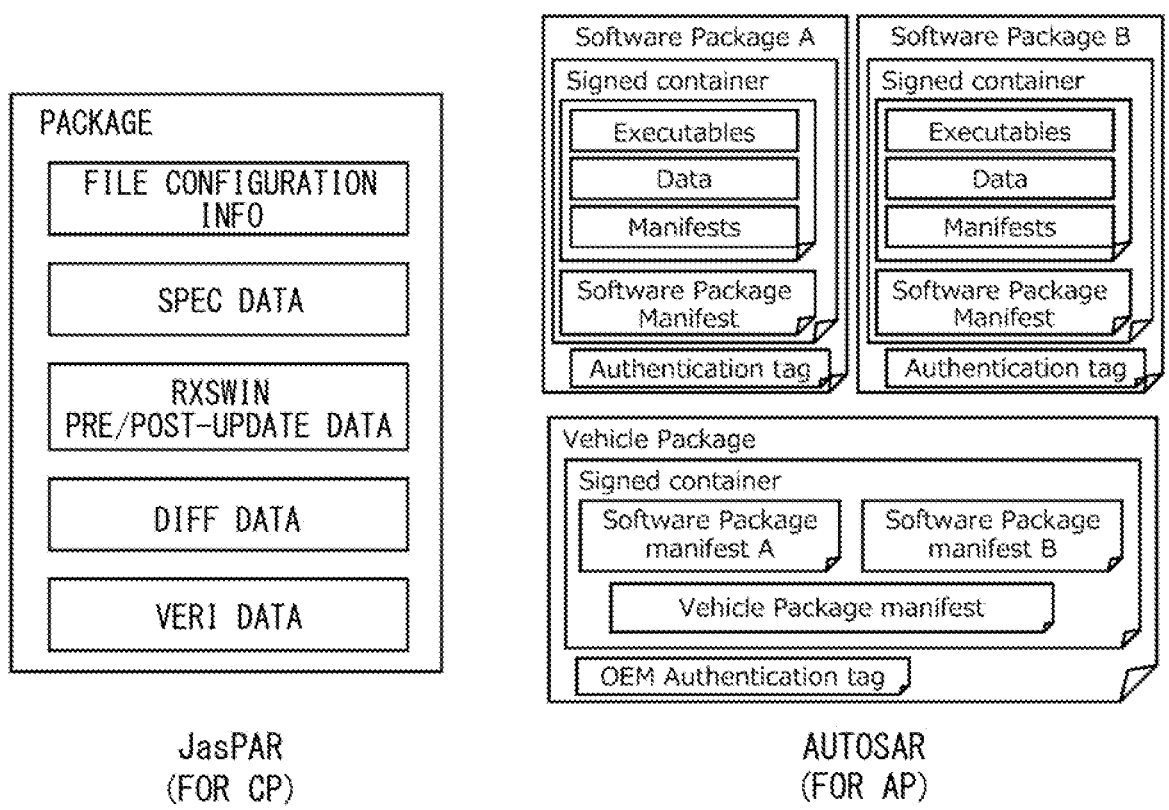
FIG. 14 is a diagram showing a package structure of each of CP and AP of an ECU platform.

Note that the drawing in FIG. 5 is quoted from pages 50, 52, and 53 of "Specification of Update Configuration Management AUTOSAR AP R20-11, Document ID No. 706". The same applies to a diagram of the package structure for AP shown in FIG. 14.

In FIG. 4, in Nos. 3, 4, 7, and 8 in which the target ECU 19 is a CP, the integrated package includes specification data, file configuration information, and various verification data as needed. Further, difference data, which is a difference between the update data and the pre-update data, is included in the integrated package in Nos. 3 and 7 where the OTA method is storage, but is not included in the integrated package in No. 4 and 8 where the OTA method is streaming, i.e., is provided as a separate file.

The file configuration information (DCM specifications) is (i) information that associates the file name (FILE) with its role (TYPE) and the target ECU 19 (ECU-ID), (ii) information that identifies which data has which binary file name (xxxxxxxx.bin), and the like. The OTA master on the vehicle side determines, by interpreting the file configuration information, (i) which binary file plays which role (for example, specification data or the like), (ii) to which target ECU 19 the binary files should be transferred, and the like.

The following programs and data are registered in the ECU repro data DB 46, for example. Regarding the latest "ECU SW ID" of the update target ECU 19, an old and new program files of the ECU, the integrity verification data of the new program, the update data file which is the difference data between the new program and the old program, and the integrity verification data of the update data, the rollback data file, which is also difference data, the integrity verification data of the rollback data, and the like are registered in the ECU repro data DB 46. The integrity (or validity) verification data is a hash value obtained by applying a hash function to the data value.

Figure 6:
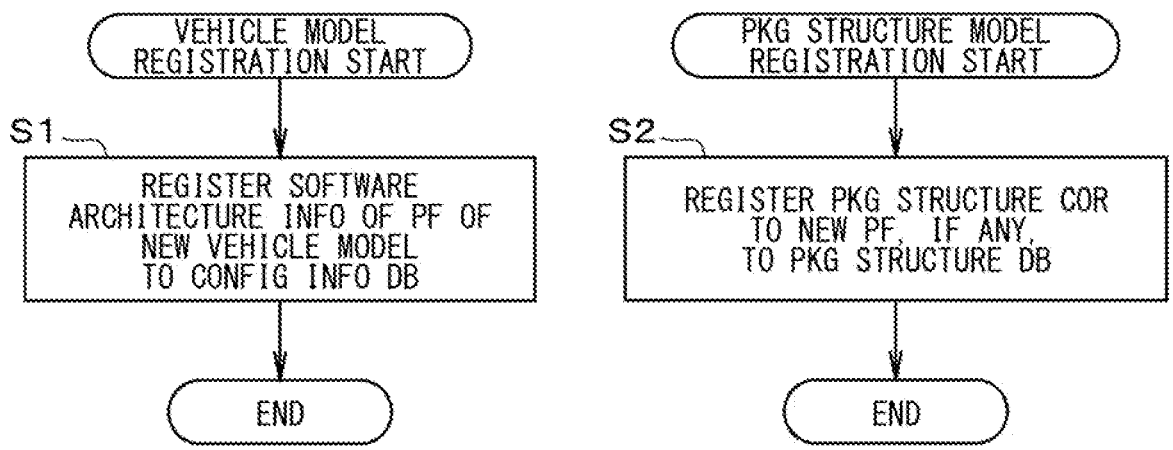
FIG. 6 is a flowchart showing a vehicle model registration process and a package structure model registration process in the center device.

The following describes an operation of the present embodiment. As shown in FIG. 6, when the information storage unit 31 of the center device 3 starts the registration of the vehicle model, the information storage unit 31 registers the Information on the software architecture in the configuration information DB 45 for the PF of each ECU mounted on a new vehicle model (S1). Further, when the information storage unit 31 starts the registration of a package structure model, if a new PF exists, the information storage unit 31 registers a package structure corresponding to the PF in the PKG structure DB 44 (S2).

Figure 7:
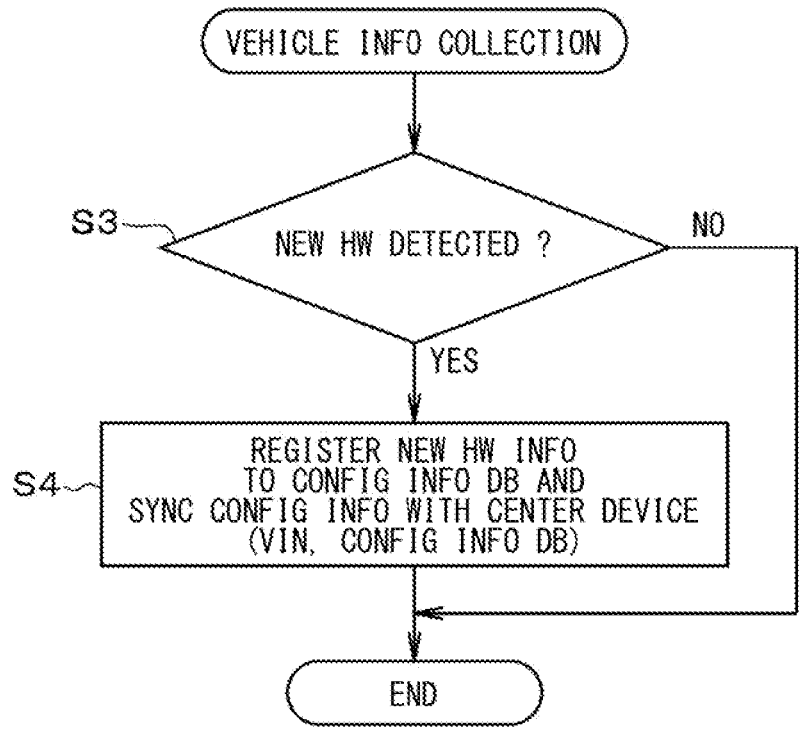
FIG. 7 is a flowchart showing a registration process of vehicle configuration information in the center device.

Further, as shown in FIG. 7, when the information storage unit 31 collects vehicle information about a sold vehicle, if it is detected that a new hardware device such as LiDAR (Light Detection And Ranging) is added to the vehicle (S3; Yes), the information of the detected device is registered in the configuration information DB 45 and the information is synchronized (with the center device 3) (S4).

As shown in FIG. 8, when the determination unit 32 starts a distribution package generation process, the determination unit 32 obtains the information of the distribution target vehicle (S11). The distribution target vehicle can be obtained by comparing the information of the vehicle registered respectively in the individual vehicle information DB 41 and the configuration information DB 45. For example, for the vehicle model B shown in FIG. 3, it is assumed that the software of the target ECU 19 having ID=5, 6 has an update.

Next, the determination unit 32 searches the configuration information DB 45, and identifies the software architecture of the update target vehicle model (S12). For example, regarding the vehicle model B described above, the software architecture of the target ECU 19 with ID=5 and 6 is respectively identified as structure No. 6 and 8. Subsequently, the PKG structure DB 44 is searched, and the package structure to be generated for the update target vehicle model is identified (S13). Then, the determination unit 32 instructs the PKG generation unit 33 to generate the package corresponding to the structure Nos. 6 and 8.

Upon receiving the package generation processing request, the PKG generation unit 33 generates an integrated package from the identified package structure (S14). Here, the "integrated package" itself and a method of constructing the "integrated package" are described with reference to FIG. 9. Note that the structure Nos. 6 and 8 of FIG. 9 correspond to the package structures in Nos. 6 and 8 of FIG. 4.

For the vehicle model B shown in FIG. 3, when the software is going to be updated for the target ECUs 19 with ID=5 and 6, the information for the target ECU 19 with ID=5 and ID=6 needs to be distributed from the center device 3 to the vehicle side system 4 as one integrated package. Note that, in the storage method, the integrated package includes (i) the update data file which are the difference data between the new program and the old program and (ii) the software package. In the streaming method, the update data file, which is the difference data between the new program and the old program, and the software package are not included in the integrated package.

Figure 9:
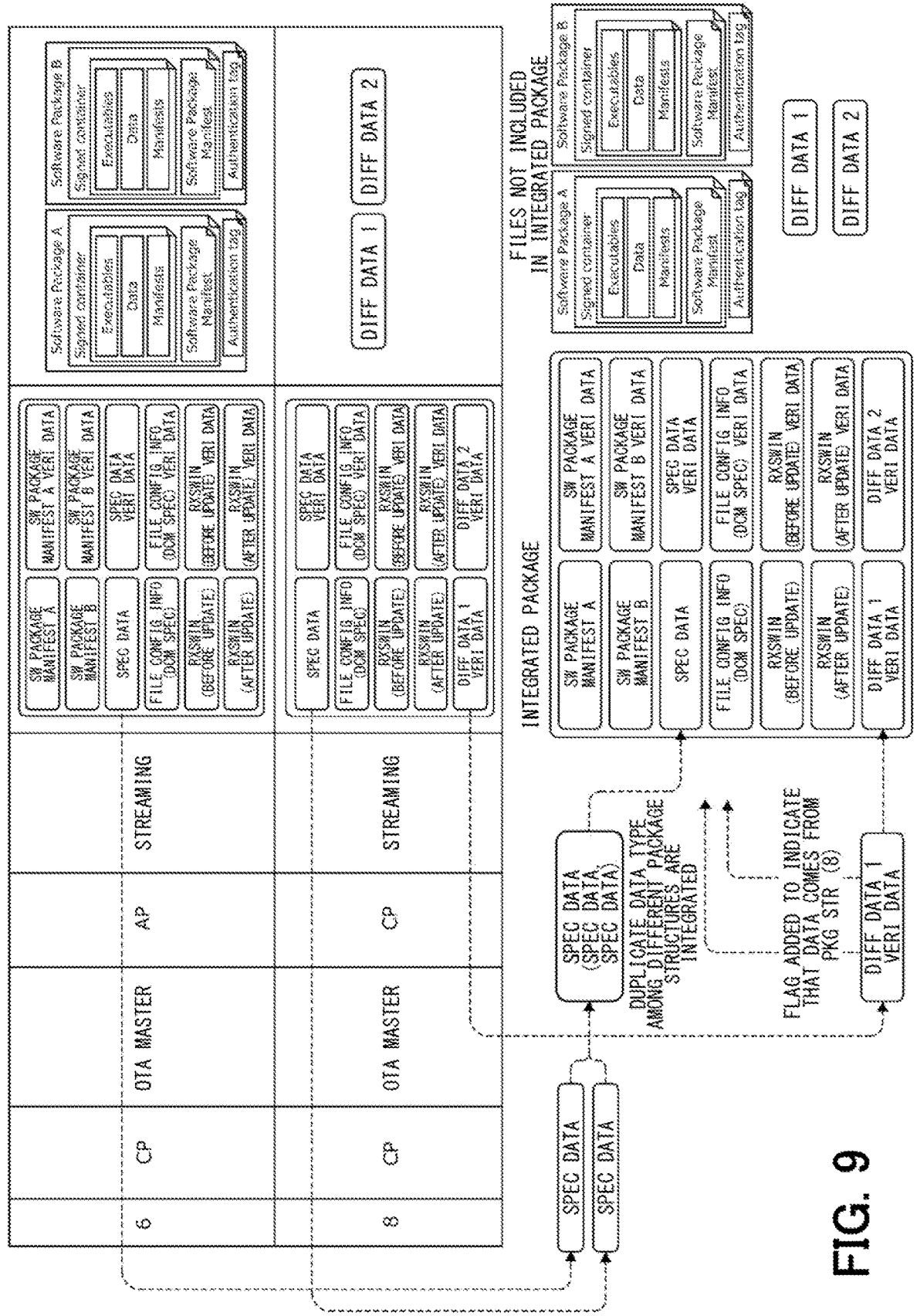
FIG. 9 is a diagram illustrating an integrated package.

In FIG. 9, respective package structures corresponding to the structure Nos. 6 and 8 shown in an upper row is integrated into one package structure as shown in a lower row. This is called an integrated package structure. For a data item existing in both of the structures Nos. 6 and 8, that is, the specification data for example, such an overlapping item is integrated as one item in the integrated package structure. In addition, a flag indicating that the integrated package is an integration of the structure Nos. 6 and 8 is added to the specification data. In such case, since the OTA method is streaming for both of the structure Nos. 6 and 8, the software packages A and 8 and the difference data 1 and 2 are files not included in the integrated package.

Description of FIG. 8 resumes. Next, the PKG generation unit 33 obtains information required for generating a package from the ECU repro data DB 46 and the ECU metadata DB 42 (S15). Here, the "required information" is, for example, specification generation data, manifest generation data, design configuration information, package generation conditions, difference data, verification data, and the like. Then, an update software package is generated (as an integrated package) (S16).

Subsequently, the verification data generation unit 34 determines whether or not a package whose OTA method is streaming is included (S17), and if it is included (S17:Yes) MAC (Message Authentication Code) signature process is performed (S18), and if it is not included (S17:No), a digital signature of the update data is calculated and given/added to the package (S19). Then, the generated package is registered in the package DB 43 (S20).

Figure 10:
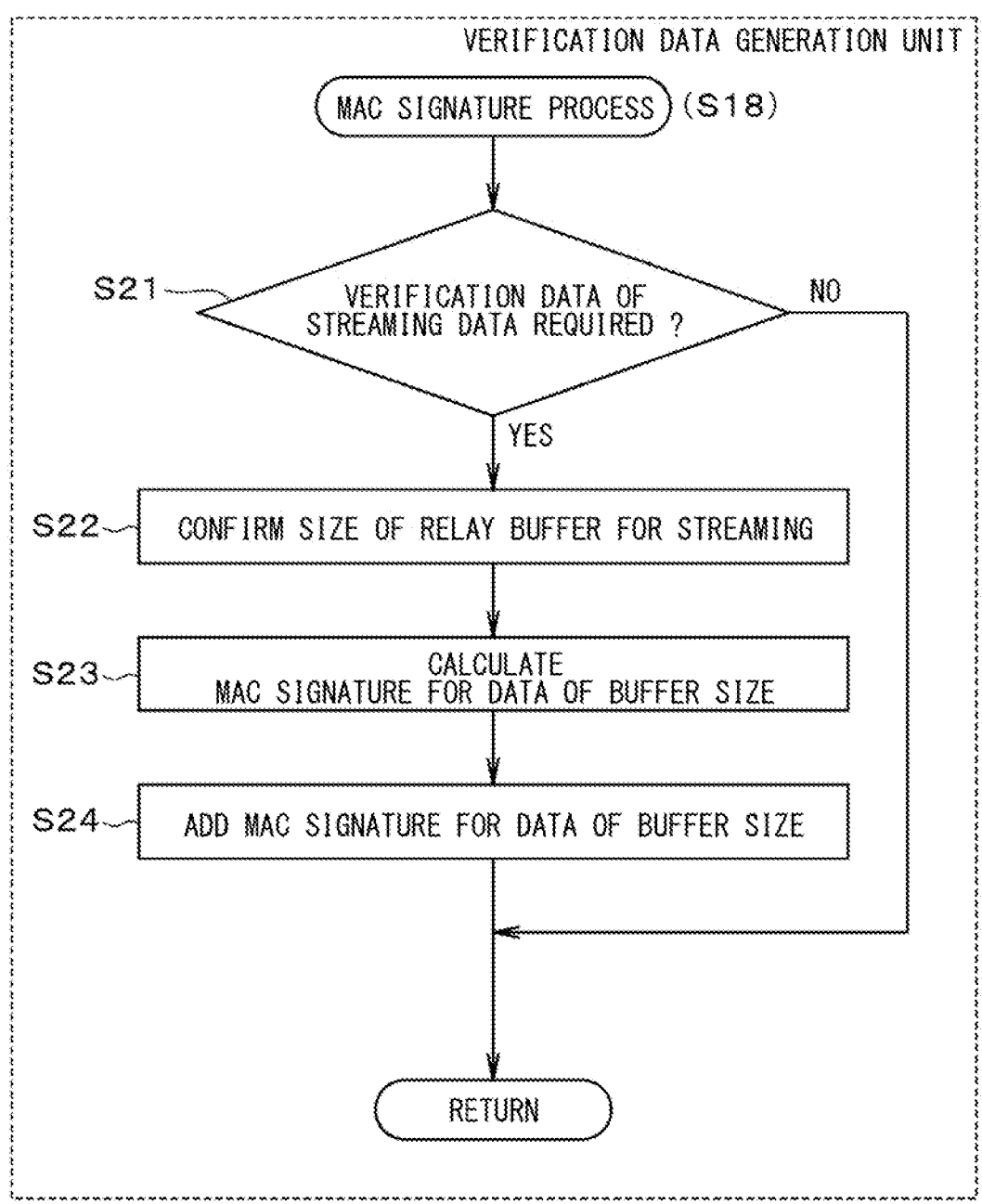
FIG. 10 is a flowchart showing a verification data generation process in the center device.

As shown in FIG. 10, when the verification data generation unit 34 starts the MAC signature process, if addition of the verification data to the streaming data is required (S21; Yes), the size of a relay buffer used for streaming is confirmed (S22), the MAC signature is calculated for data of buffer size (S23), and the MAC signature is given to the some data of having a size associated with a buffer size of the relay buffer (S24). For example, when the size of the relay buffer is 10 kB and AES (Advanced Encryption Standard) 126 bits is adopted as the common key encryption method for MAC signature, 16 bytes of signature data are added for every 10 kB.

Figure 11:
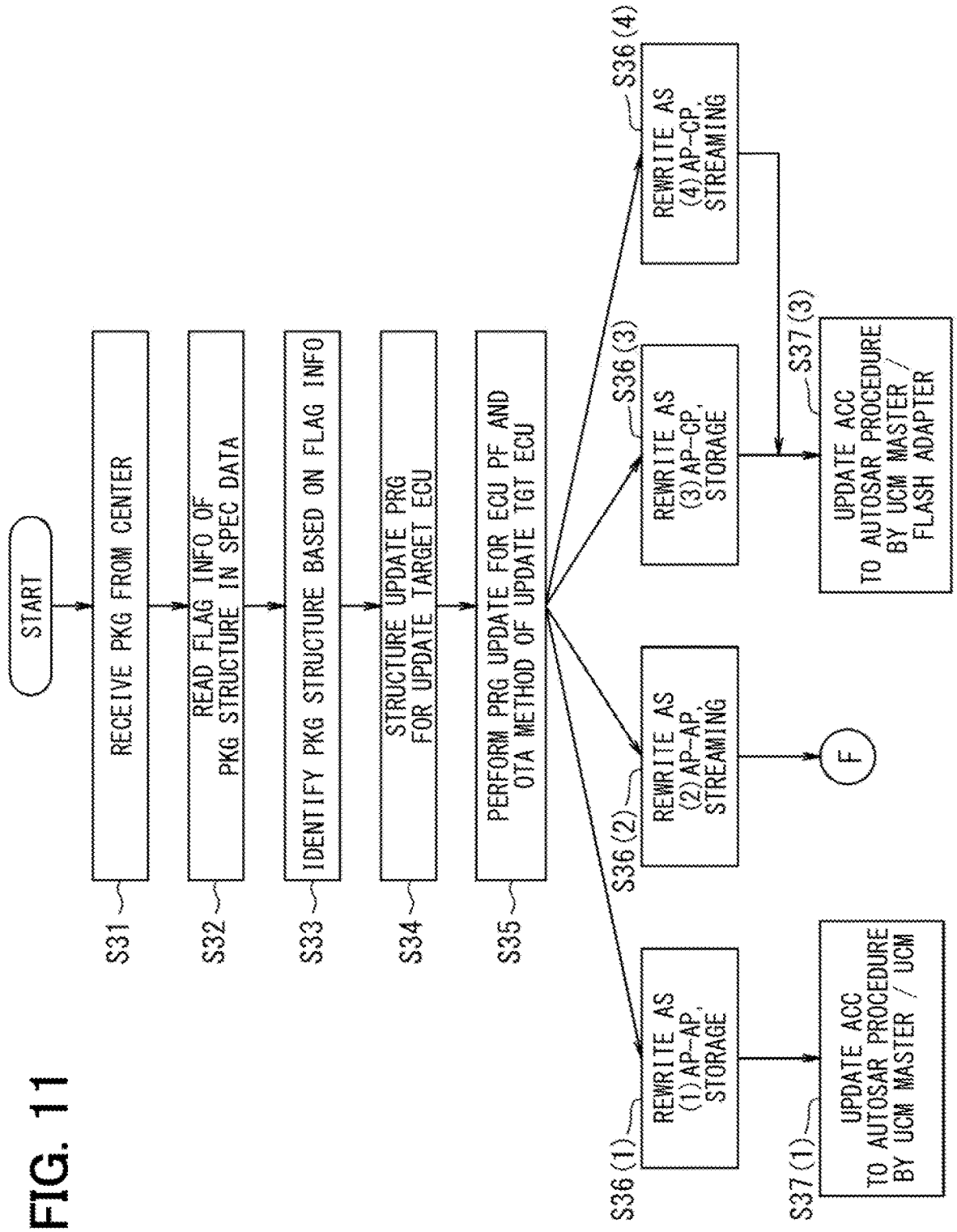
FIG. 11 is a flowchart showing a reprog process when the central ECU is an AP in a vehicle-side system (No. 1)

Next, the processing on the vehicle-side system 4 side that performs the reprog according to the distributed package is described. Steps S31 to S35 are substantially the same among the processing in FIG. 11 in which the central ECU 13 is an AP and the processing in FIG. 12 in which the central ECU 13 is a CR When a distribution package is received from the center device 3 (S31), flag information of the package structure stored in the specification data is read (S32). Note that, when the central ECU 13 is an AP, the information corresponding to the specification data is included in the manifest included in each of the software package and the vehicle package.

Subsequently, when the package structure is identified based on the flag information (S34), the program is updated and the reprog is performed for respective platforms and OTA methods of the target ECUs 19 in each of the package structures (S35). From here, when the central ECU 13 is an AP, the process branches as steps S36 (1) to S36 (4) according to the package structure Nos. 1 to 4, and when the central ECU 13 is a CP, the process branches as steps S36 (5) to S36 (8) according to the package structure Nos. 5 to 8.

In step S36 (1), the rewriting is performed as the one when the combination of the central-target ECU is AP-AP and the OTA method of the target ECU 19 is storage. In such case, the update is performed by the UCM master/UCM according to a procedure described in the AUTOSAR Specification (SWS) (S37 (1)). In step S36 (2), the rewriting is performed as the one when the combination is AP-AP and the OTA method is streaming, and steps S38 to S45 shown in FIG. 13 to be described later are performed.

In step S36 (3), the rewriting is performed as the one when the combination is AP-CP and the OTA method is storage. In such case, the update is performed by the UCM master and a flushing adapter according to a procedure described in the AUTOSAR Specification (SWS) (S37 (3)). In step S36 (4), the rewriting is performed as the one when the combination is AP-CP and the OTA method is streaming, and the process proceeds to step S37 (3).

Figure 12:
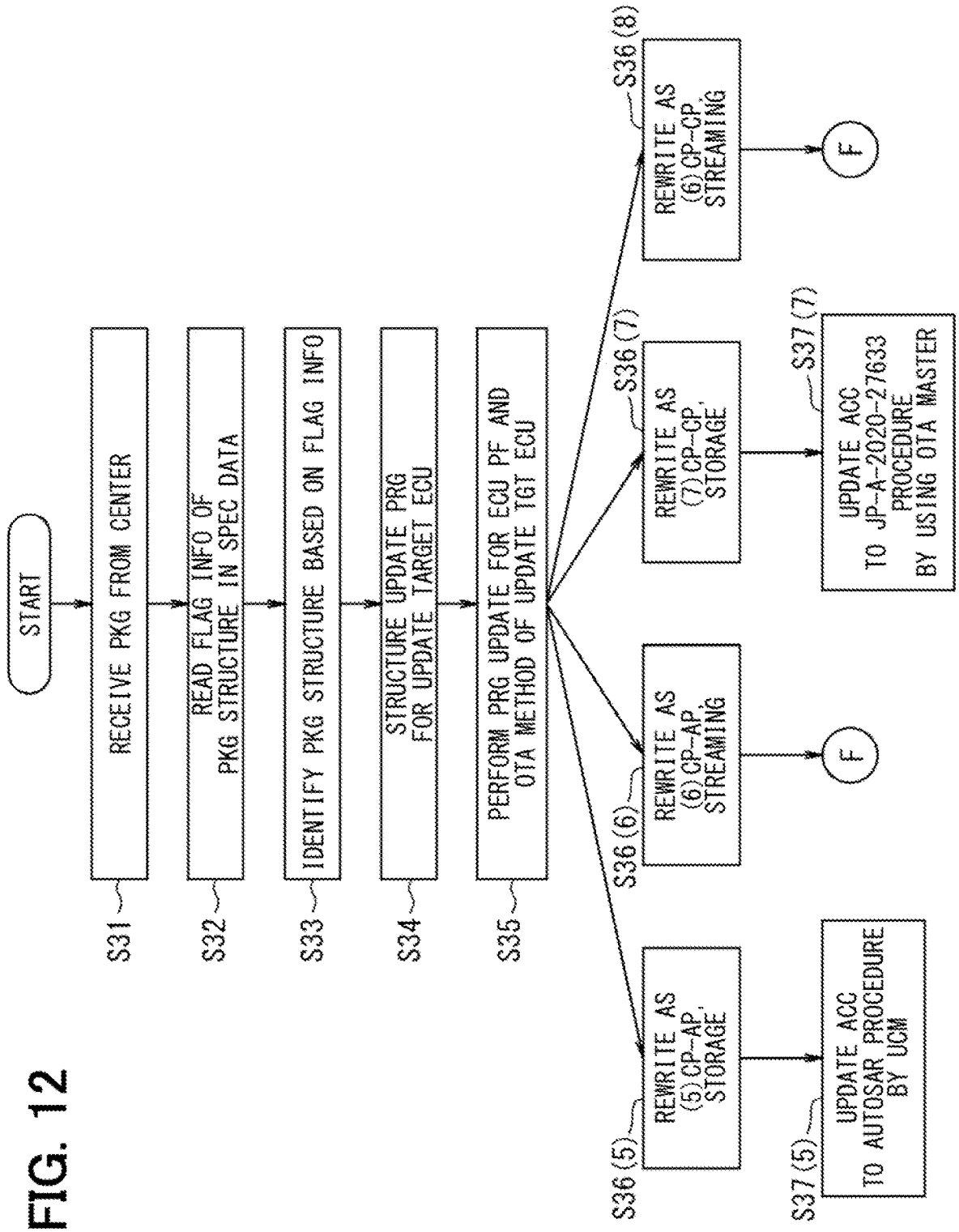
FIG. 12 is a flowchart showing a reprog process when the central ECU is a CP in the vehicle-side system (No. 1)

In step S36 (5) shown in FIG. 12, the rewriting is performed as the one when the combination is CP-AP and the OTA method is storage. In such case, the update is performed by UCM according to the procedure described in the AUTOSAR Specification (SWS) (S37 (5)). In step S36 (6), the rewriting is performed as the one when the combination is CP-AP and the OTA method is streaming, and steps S38 to S45 are performed.

In step S36 (7), the rewriting is performed as the one when the combination is CP-CP and the OTA method is storage. In such case, the OTA master performs update according to the procedures described in paragraphs [0381] to [0400] and FIGS. 115 to 118 in a Japanese Patent application of JP-A-2020-27633 (S37 (7)). In step S36 (8), the rewriting is performed as the one when the combination is CP-CP and the OTA method is streaming, and steps S38 to S45 are performed.

Figure 13:
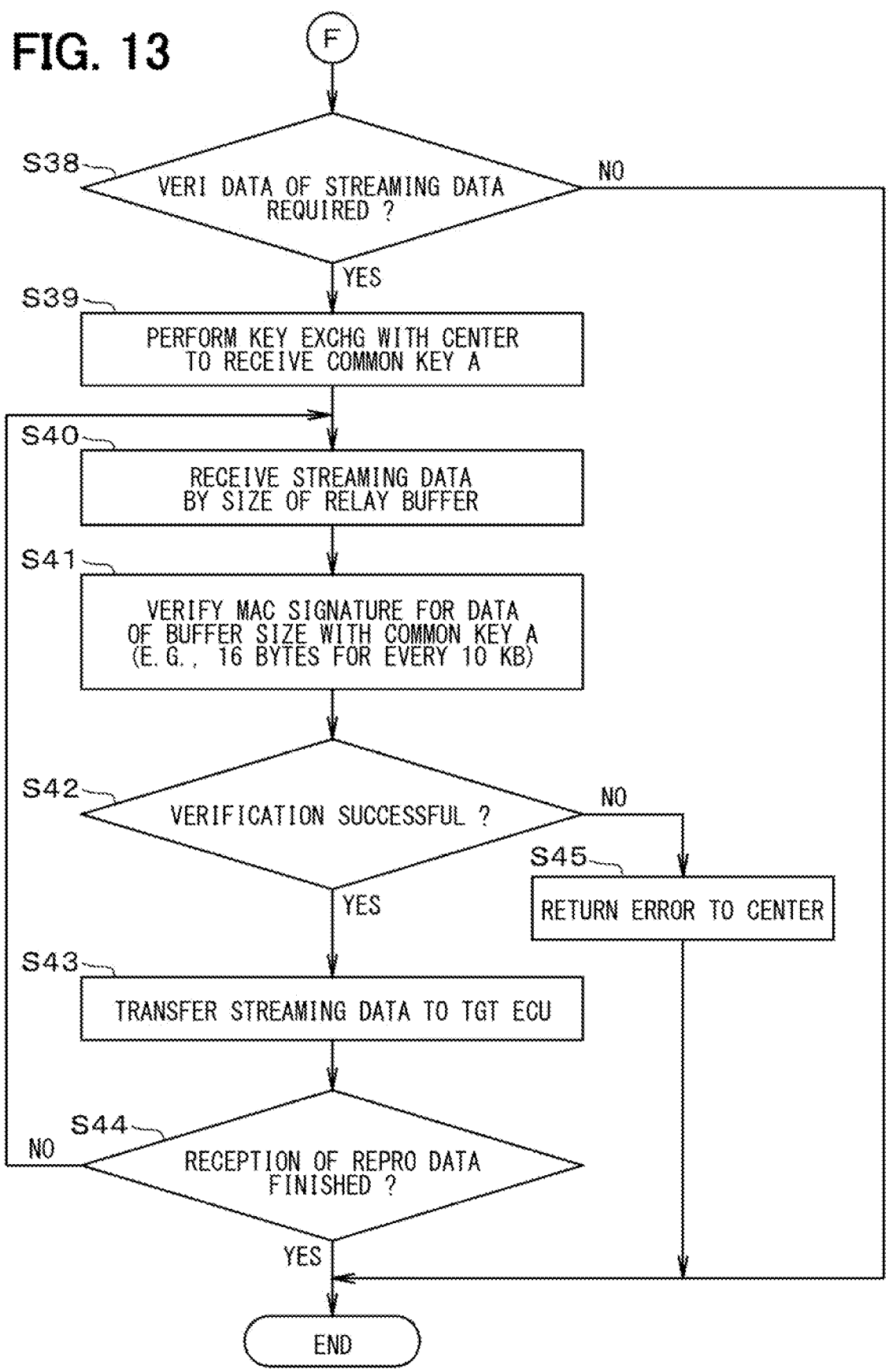
FIG. 13 is a flowchart showing a reprog process in the vehicle-side system (No. 2)

In step S38 shown in FIG. 13, if the verification data of streaming data is required (S38:Yes), a common key A used for signing the streaming is received by key-exchange with the center device 3 (S39). Then, when the streaming data is received by the size of the relay buffer (S40), the MAC signature is verified using the common key A for the data of buffer size (S41).

If the verification is successful (S42:Yes), the streaming data is transferred to the target ECU 19 (S43) Then, the process returns to step S40 and the process is repeated until all the repro data is received (S44:No). If the verification fails in step S42 (S42:No), an error is returned to the center device 3 (S45).

As described above, according to the present embodiment, the individual vehicle information DB 41 of the center device 3 stores the device identity and the information regarding the software architecture of the relevant device together with the vehicle category for each of the plurality of ECUs 19. In the PKG structure DB 44, for each of the plurality of ECUs 19, the information regarding the structure of the package to be distributed for updating the data is stored according to the type of each of the ECUs 19.

Based on the information stored in the individual vehicle information DB 41 and the PKG structure DB 44, the determination unit 32 identifies a package to be distributed for a target vehicle having a target device whose data should be updated among the plurality of ECUs 19. Then, the PKG generation unit 33 generates a package including the information indicating the structure of the identified package.

With such a configuration, the PKG generation unit 33 can generate a package to be distributed to the target vehicle as the one having an appropriate structure corresponding to the software architecture of the target device, even when various types of ECUs 19 having different structures are mounted on the target vehicle. Therefore, even for vehicles in which different types of ECUs 19 are mixed, all the updated data can be distributed in one package.

Further, the information indicating the structure of the package includes information indicating that (i) the platform type is either AP or CP, which is the platform type of the ECU 19 defined in the AUTOSAR specifications, and (ii) the OTA method for updating the data is one of the storage method or the streaming method. With such a configuration, it is possible to generate a distribution package corresponding to each of the vehicles in which the ECUs 19 having different platform types and data update methods are mixed.

Further, when the type of the central ECU 13 that relays data for the target ECU 19 to update the data is AP, the PKG generation unit 33 generates a package having a structure that is processable by the UCM master, and when the type of the central ECU 13 is CP, generates a package having a structure that is processable by the OTA master. Therefore, an appropriate distribution package can be generated according to the type of the central ECU 13 defined by AUTOSAR.

Further, the PKG generation unit 33 generates a package having a structure that is processable by the UCM when the type of the target ECU 19 is AP, and generates a package having a structure that is processable by the installer when the type of the target ECU 19 is CR Therefore, an appropriate distribution package can be generated according to the type of the target ECU 19.

Further, the PKG generation unit 33 generates an integrated package including update data when the OTA method is a storage method, and generates an integrated package not including update data when the OTA method is a streaming method. Therefore, an appropriate distribution package can be generated corresponding to the OTA method of each of the target ECUs 19. In addition, when the OTA method is the streaming method, in order to verify the validity of the data, the verification data MAC-signed by the common key encryption method is added, so the validity of the data can be securely performed on the vehicle side.

On the other hand, the central ECU 13 of the vehicle-side system 4 determines, from the information included in the distribution package received from the center device 3, whether (i) the platform of each ECU is either AP or CP, and (ii) the OTA method is the storage method or streaming method, and switches the processing of the distribution package according to the identified PF and method. Therefore, it is possible to perform a reprog of each target ECU 19 or the like according to the information included in the distribution package.

Further, if the OTA method is a streaming method, the central ECU 13 obtains a common key from the center device 3 and verifies the validity of the received data by MAC signature using the common key encryption method. Further, when a new hardware device is added to the vehicle, the central ECU 13 transmits the information of the new device to the center device 3, and the center device 3 adds the device to the information of the corresponding vehicle in the individual vehicle information DB 41, thereby update of the information of the individual vehicle information DB 41 can be updated in response to a case where the hardware device is added to the vehicle in the aftermarket.

Other Embodiments

The PF of the ECU is not limited to AP and CP, and may correspond to other PFs. Verification by MAC signature using common key encryption method may be performed as required. The signature is not limited to the MAC signature. When it is detected that a new hardware device or the like has been added to the vehicle as shown in FIG. 7, the process of registering the device information in the configuration information DB 45 may be performed as required.

The integrated package may be generated as follows. The PKG generation unit 33 analyzes the structure of the package identified by the determination unit 32, and if it is different from the package structure stored in the PKG structure DB 44, the PKG generation unit 33 may generate an integrated package structure including data items that are included in at least one of package structures, and may generate one integrated package for a plurality of target devices based on the generated integrated package structure.

Figure 15:
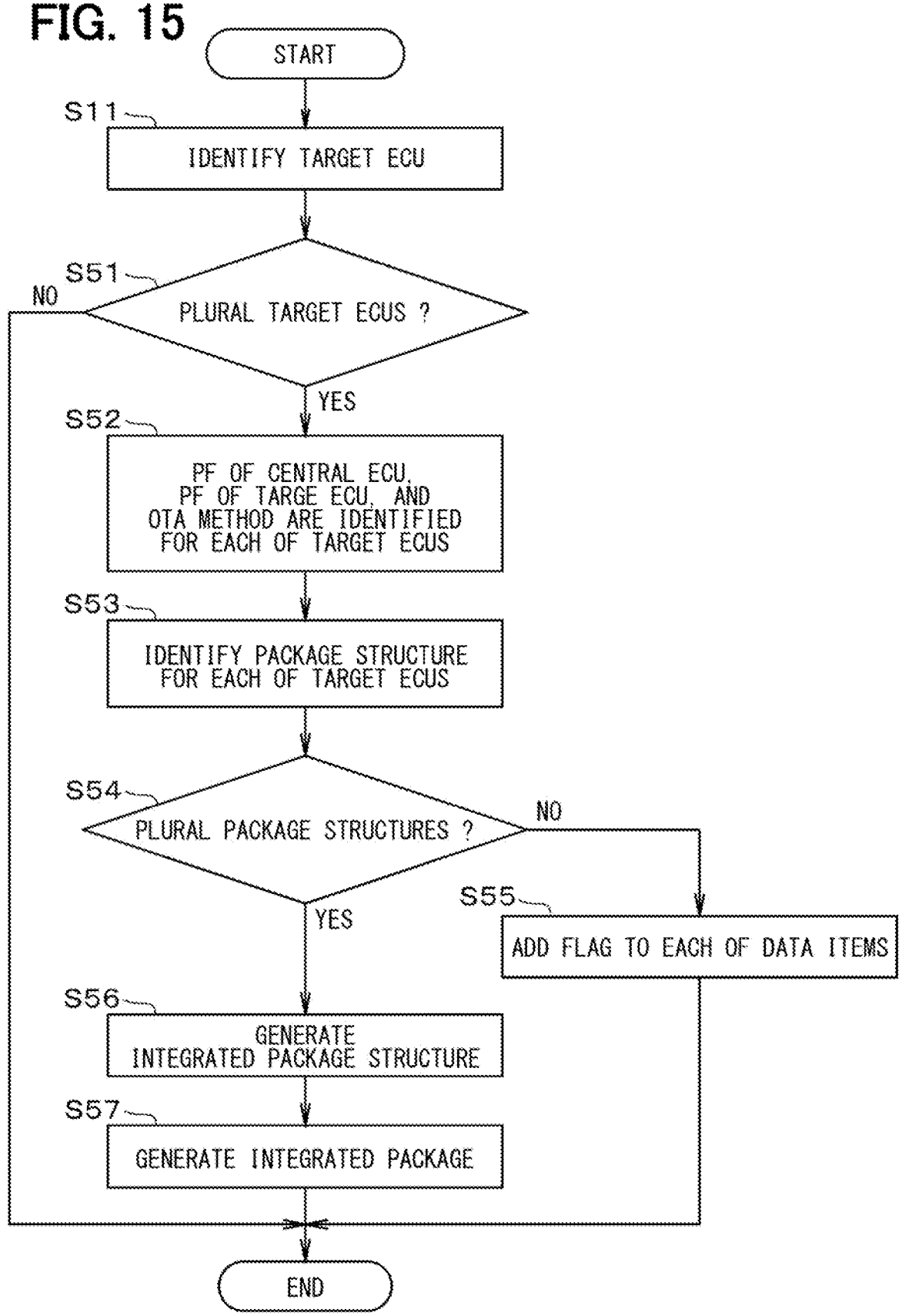
FIG. 15 is a diagram illustrating structure of an integrated package and a method of generating an integrated package.

FIG. 15 illustrates the integrated package structure and the method of generating the integrated package. First, in S11, as described above, the information of the distribution target vehicle is obtained. The target ECU 19 to be updated is identified. In S51, it is determined whether or not there are a plurality of target ECUs 19 to be updated. If there are not a plurality of target ECUs 19 (S51:No), an integrated package is not constructed. When it is determined that there are a plurality of target ECUs 19 (S51:Yes), the PF of the target ECU 19, the update method, and the PF of the central ECU 13 are identified in S52 based on the ID of the target ECU 19. The determination unit 32 searches the configuration information DB 45 to identify the software architecture of the update target vehicle model.

In S53, referring to the PKG structure DB 44, the corresponding package structure, that is, the PKG structure No. is identified based on the PF of the target ECU 19, the update method, and the PF of the central ECU 13. For each of the plurality of target ECUs 19, the package structure required by the central ECU 13 and the target ECU 19 is identified for updating the application program.

In S54, it is determined whether or not there are a plurality of package structures. When a plurality of target ECUs 19 are updated but one type of package structure is used (S54: No), the process proceeds to S55. In such case, the package structure stored in the PKG structure DB 44 becomes the integrated package structure.

In S55, a flag is added to the data to form an integrated package so that the vehicle-side system 4 can determine to which target ECU 19 the data is designated. Assuming that the package structure corresponding to the two target ECUs 19 is the structure No. 6. In such case, there are specification data for updating the application program of a first target ECU 19 and specification data for updating the application program of a second target ECU 19. Thus, a flag is added to each of the specification data.

If there are a plurality of package structures (S54:Yes), the process proceeds to S56 to generate an integrated package structure. The integrated package structure is, for example, a package structure shown in the lower part of FIG. 9. The integrated package structure is a package structure that is not included in the PKG structure DB 44 shown in FIG. 4. The integrated package structure is generated when there are a plurality of target ECUs 19 and the package structure with respect to the target ECUs 19 is different among the plurality of target ECUs 19.

In S56, data items constituting the package structure are extracted for a plurality of package structures to be integrated. In the example shown in FIG. 4, Vehicle PKG, SW PKG, specification data, file configuration information, verification data, difference data, and the like correspond to data items. In the example shown in FIG. 9, SW package manifest, SW package manifest verification data, specification data, specification data verification data, file configuration information, file configuration information verification data. RXSWIN before update, RXSWIN before update verification data, RXSWIN after update, RXSWIN after update, RXSWIN after update verification data, difference data verification data, and the like correspond to data items.

Further, in S56, the data items of the integrated package structure are set. The data items included in the integrated package structure are, respectively, a data item included in at least one package structure among the plurality of package structures. In such manner, an integrated package structure is generated. In S57, the corresponding data is extracted from a plurality of packages for each of the data items, and an integrated package is generated. The PKG generation unit 33 obtains the information required for generating the package from the ECU repro data DB 46 and the ECU metadata DB 42. A flag is added so that the vehicle-side system 4 can determine which package or which target ECU 19 the data is destined/designated for.

By performing the above steps, a plurality of packages for the plurality of target ECUs 19 are generated as one integrated package regardless of whether the structures of the packages are the same or different. Since the processing after S57 is the same as the processing after S17 in FIG. 8, the description is omitted.

The means and/or functions provided by each device or the like can be provided by software recorded in a substantive memory device and a computer that executes the software, software only, hardware only, or a combination thereof. For example, if the control device is provided by an electronic circuit that is hardware, the control device may be provided by a digital circuit or an analog circuit that includes a large number of logic circuits. While the present disclosure has been described in accordance with the embodiment, it is understood that the present disclosure is not limited to such embodiments or structures. The present disclosure also encompasses various modified examples and modifications within a range of equivalence. In addition, various combinations and forms, as well as other combinations and forms including only one element, more than that, or less than that, are also within the scope and idea of the present disclosure.

The controller and the method thereof described in the present disclosure may be realized by a dedicated computer provided by configuring a processor and a memory programmed to execute one or more functions embodied by a computer program. Alternatively, the controller and the method described in the present disclosure may be realized by a dedicated computer configured as a processor with one or more dedicated hardware logic circuits. Alternatively, the controller and the method thereof described in the present disclosure may be realized as one or more dedicated computers configured as a combination of (i) a processor and memory programmed to perform one or more functions and (ii) a processor composed of one or more hardware logic circuits. The computer programs may be stored, as instructions to be executed by a computer, in a tangible, non-transitory computer-readable storage medium.

What is claimed is:

1. A center device for managing data that is written to a plurality of electronic control devices mounted on a target vehicle, the center device comprising:
   a vehicle information storage unit storing: (i) device identification information for identifying an electronic control device of the plurality of electronic control devices, (ii) information on a software architecture of the electronic control device, and (iii) information on an update method for data update of the electronic control device, the device identification information, the information on the software architecture, and the information on the update method being stored with a vehicle category of a target vehicle,
   a package structure storage unit storing information on a structure of a package that is distributed for data update of the electronic control unit, according to:
      (a) information on software architecture of relay device(s) relaying data for data update among the plurality of electronic control devices,
      (b) information on software architecture of update target device(s) among the plurality of electronic control devices, and
      (c) information on update methods of data update;
   a determination processing unit identifying a structure of the package for the target vehicle that carries, from among the plurality of electronic control devices, target electronic control devices for data update, based on the information stored in the vehicle information storage unit and the package structure storage unit; and
   a package generation unit generating a package including information indicating the structure of the package identified by the determination processing unit;
   wherein:
   the center device is located outside the target vehicle and wirelessly communicates with the electronic control devices mounted on the target vehicle;

when the plurality of target electronic control devices for data update include devices having different software architectures and/or update methods, the package generation unit generates a single integrated package including update data for all of the target electronic control devices; and for each data item included in the single integrated package, the package generation unit adds information indicating a corresponding target electronic control device, such that an in-vehicle electronic control device of the target vehicle can identify a destination of each item.

2. The center device of claim 1, wherein
the information indicating the structure of the package includes:
(i) information indicating an adaptive platform (AP) or a classic platform (CP) defined as platform types in AUTOSAR specification documents, and
(ii) information indicating a streaming method or a storage method as update method information regarding the update methods of data update.

3. The center device of claim 2, wherein
at least one of the plurality of electronic control devices is a relay device for relaying data for data update of the target device,
the package generation unit generates
a package that has a structure processable by an update and configuration management (UCM) master when the type of the relay device is AP, and
a package that has a structure processable by an over-the-air (OTA) master when the type of the relay device is CP.

4. The center device of claim 2, wherein
the package generation unit generates
a package that has a structure processable by UCM when the type of target device is AP, and
a package that has a structure processable by installer when the type of target device is CP.

5. The center device of claim 2, wherein
the package generation unit generates
an integrated package that includes update data when the data update method is the storage method, and
an integrated package that does not include update data when the data update method is the streaming method.

6. The center device of claim 2, wherein
the package generation unit gives verification data that is message authentication code (MAC) signed by a common key encryption method when the data update method is the streaming method.

7. The center device of claim 1, wherein
the package generation unit analyzes the structure of the package identified by the determination processing unit, and, when the analyzed structure of the package is different from the structure of the package stored in the package structure storage unit, generates an integrated package structure including data items that are included in at least one of plural package structures, and the package generation unit generates, based on the generated integrated package structure, one integrated package for a plurality of target devices.

8. An in-vehicle electronic control device mounted on a vehicle and communicable with the center device of claim 2, the in-vehicle electronic control device comprising:
a package processing unit switching processing of the package according to a determination of whether (i) a platform of the electronic control unit is either an adaptive platform or a classic platform, and (ii) an over-the-air (OTA) method is a storage method or a streaming based on information included in the received package.

9. The in-vehicle electronic control device mounted on a vehicle of claim 8, the in-vehicle control device comprising:
a communication device capable of performing communication with the center device, wherein
the processing of the package is switched according to a determination of whether (i) the platform of the electronic control unit is either an adaptive platform or a classic platform, and (ii) the over-the-air (OTA) method is a storage method or a streaming based on information included in the received package.

10. The in-vehicle electronic control device of claim 9, wherein
when performing the streaming method for the OTA, a common key is obtained from the center device, and validity of the received data is verified by a MAC signature using a common key encryption method.

11. A package distribution system comprising:
the center device of claim 2, and
an in-vehicle electronic control device mounted on a vehicle and communicable with the center device, the in-vehicle electronic control device comprising a package processing unit switching processing of the package according to a determination of whether (i) a platform of the electronic control unit is either an adaptive platform or a classic platform, and (ii) an over-the-air (OTA) method is a storage method or a streaming based on information included in the received package;
wherein:
upon having a new hardware device added to the vehicle, the in-vehicle electronic control device transmits information on the new hardware device to the center device, and
the center device adds the information on the new hardware device to the information of a corresponding vehicle stored in the vehicle information storage unit.

* * * * *